United States Patent
Chapin

(10) Patent No.: US 10,481,961 B1
(45) Date of Patent: Nov. 19, 2019

(54) API AND STREAMING SOLUTION FOR DOCUMENTING DATA LINEAGE

(71) Applicant: Capital One Services, LLC, McLean, VA (US)

(72) Inventor: Ann Chapin, Powhatan, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/372,580

(22) Filed: Apr. 2, 2019

(51) Int. Cl.
- *G06F 16/25* (2019.01)
- *G06F 9/54* (2006.01)
- *G06Q 40/02* (2012.01)

(52) U.S. Cl.
CPC ............ *G06F 9/547* (2013.01); *G06F 16/258* (2019.01); *G06Q 40/02* (2013.01)

(58) Field of Classification Search
CPC ........ G06F 9/547; G06F 16/258; G06Q 40/02
See application file for complete search history.

(56) References Cited

U.S. PATENT DOCUMENTS

| | | | |
|---|---|---|---|
| 6,343,295 B1 | 1/2002 | MacLeod et al. | |
| 6,434,558 B1 | 8/2002 | MacLeod et al. | |
| 9,075,860 B2 | 7/2015 | Kozina et al. | |
| 9,477,786 B2 | 10/2016 | Yost et al. | |
| 9,519,695 B2 | 12/2016 | Sampathkumaran et al. | |
| 2005/0138081 A1* | 6/2005 | Alshab | G06Q 10/06 |
| 2006/0184498 A1* | 8/2006 | Meyer | G06F 11/3476 |
| 2013/0332423 A1* | 12/2013 | Puri | G06F 16/219 |
| | | | 707/687 |
| 2016/0140204 A1 | 5/2016 | Brown et al. | |
| 2017/0091680 A1 | 3/2017 | Rosenthal et al. | |
| 2017/0270022 A1 | 9/2017 | Moresmau et al. | |
| 2018/0181630 A1* | 6/2018 | He | G06F 16/9024 |

* cited by examiner

*Primary Examiner* — Loc Tran

(74) *Attorney, Agent, or Firm* — Troutman Sanders LLP; Christopher J. Forstner; John A. Morrissett

(57) ABSTRACT

A system for tracing data lineage includes a non-transitory computer readable medium and a processor. The processor is configured to execute an application programming interface (API) to perform the following. The processor instantiates a first instance of the API to document a first data lineage in a first data transformation process. The processor instantiates a second instance of the API to document a second data lineage in a second data transformation process. The processor sends the first data lineage and the second data lineage for storage in the non-transitory computer readable medium.

16 Claims, 6 Drawing Sheets

| INPUT | | | | OUTPUT | | | | |
|---|---|---|---|---|---|---|---|---|
| AcctId | Status | Balance | CreditLimit | AcctId | Status | Balance | CreditLimit | Balance % of Limit |
| 3423545 | Open | 2000 | 3000 | 3423545 | Open | 2000 | 3000 | 0.666666667 |
| 3423546 | Closed | 2100 | 3100 | 3423546 | Closed | 2100 | 3100 | 0.677419355 |
| 3423547 | Restricted | 2200 | 3200 | 3423547 | Restricted | 2200 | 3200 | 0.6875 |
| 3423548 | Charged-Off | 2300 | 3300 | 3423548 | Charged-Off | 2300 | 3300 | 0.696969697 |
| 3423549 | Open | 100000 | 3400 | 3423549 | Open | 100000 | 3400 | 29.41176471 |
| 3423550 | Closed | 2500 | 3500 | 3423550 | Closed | 2500 | 3500 | 0.714285714 |
| 3423551 | Restricted | 2600 | 3600 | 3423551 | Restricted | 2600 | 3600 | 0.722222222 |
| 3423552 | Charged-Off | 2700 | 3700 | 3423552 | Charged-Off | 2700 | 3700 | 0.72972973 |
| 3423553 | Open | 2800 | 1000 | 3423553 | Open | 2800 | 1000 | 2.8 |
| 3423554 | Closed | 2900 | 0 | 3423554 | Closed | 2900 | 0 | NULL |
| 3423555 | Restricted | 3000 | 4000 | 3423555 | Restricted | 3000 | 4000 | 0.75 |
| 3423556 | Charged-Off | 3100 | 4100 | 3423556 | Charged-Off | 3100 | 4100 | 0.756097561 |
| 3423557 | Open | 3200 | 4200 | 3423557 | Open | 3200 | 4200 | 0.761904762 |
| 3423558 | Closed | 3300 | 4300 | 3423558 | Closed | 3300 | 4300 | 0.76744186 |
| 3423559 | Restricted | 3400 | 2200 | 3423559 | Restricted | 3400 | 2200 | 1.545454545 |
| 3423560 | Charged-Off | 3500 | 4500 | 3423560 | Charged-Off | 3500 | 4500 | 0.777777778 |
| 3423561 | Open | 3600 | 4600 | 3423561 | Open | 3600 | 4600 | 0.782608696 |
| 3423562 | Closed | 3700 | 4700 | 3423562 | Closed | 3700 | 4700 | 0.787234043 |
| 3423563 | Restricted | 3800 | 4800 | 3423563 | Restricted | 3800 | 4800 | 0.791666667 |
| 3423564 | Charged-Off | 3900 | 4900 | 3423564 | Charged-Off | 3900 | 4900 | 0.795918367 |
| 3423565 | Open | 4000 | 5000 | 3423565 | Open | 4000 | 5000 | 0.8 |
| 3423566 | Closed | 4100 | 5100 | 3423566 | Closed | 4100 | 5100 | 0.803921569 |
| 3423567 | Restricted | 4200 | 5200 | 3423567 | Restricted | 4200 | 5200 | 0.807692308 |
| 3423568 | Charged-Off | 4300 | 5300 | 3423568 | Charged-Off | 4300 | 5300 | 0.811320755 |
| 3423569 | Open | 4400 | 5400 | 3423569 | Open | 4400 | 5400 | 0.814814815 |

FIG. 4

| TransformID | API Rule | Source/Target | Condition | Perform Transform | Log All Input fields | Log all Output Fields | Send Notification to Owner |
|---|---|---|---|---|---|---|---|
| 23322 | 1 | Target | If field(Balance % of Limit) > 1 | TRUE | TRUE | TRUE | FALSE |
| 23322 | 2 | Source | If field(CreditLimit) = 0 | FALSE | TRUE | FALSE | FALSE |
| 23322 | 3 | Source | If field(Balance) > 25000 | TRUE | TRUE | TRUE | TRUE |

FIG. 5

| TransformId | API Rule | Source Field | Source Value | Target Field | Target Value | Notification |
|---|---|---|---|---|---|---|
| 23322 | 1 | AcctId | 3423549 | AcctId | 3423549 | |
| 23322 | 1 | Status | Open | Status | Open | |
| 23322 | 1 | Balance | 100000 | Balance | 100000 | |
| 23322 | 1 | CreditLimit | 3400 | CreditLimit | 3400 | |
| 23322 | 1 | Balance/CreditLimit | | Balance % of Limit | 29.41176471 | |
| 23322 | 1 | AcctId | 3423559 | AcctId | 3423559 | |
| 23322 | 1 | Status | Restricted | Status | Restricted | |
| 23322 | 1 | Balance | 3400 | Balance | 3400 | |
| 23322 | 1 | CreditLimit | 2200 | CreditLimit | 2200 | |
| 23322 | 1 | Balance/CreditLimit | | Balance % of Limit | 1.545454545 | |
| 23322 | 2 | AcctId | 3423554 | | | |
| 23322 | 2 | Status | Closed | | | |
| 23322 | 2 | Balance | 2900 | | | |
| 23322 | 2 | CreditLimit | 0 | | | |
| 23322 | 3 | AcctId | 3423549 | AcctId | 3423549 | |
| 23322 | 3 | Status | Open | Status | Open | |
| 23322 | 3 | Balance | 100000 | Balance | 100000 | |
| 23322 | 3 | CreditLimit | 3400 | CreditLimit | 3400 | |
| 23322 | 3 | Balance/CreditLimit | | Balance % of Limit | 29.41176471 | name@company.com |

FIG. 6

API AND STREAMING SOLUTION FOR DOCUMENTING DATA LINEAGE

FIELD

The presently disclosed subject matter relates generally to documenting data lineage, more particularly, to systems and methods that implement an application program interface (API) and streaming solution for documenting data lineage.

BACKGROUND

Traditionally, as data moves from one system to the next system in files, streams or APIs, names of elements change, new elements are created, and new file formats are utilized.

Existing data lineage solutions are not fine-grained. Existing solutions require manual documentation to be entered by end users. Existing solutions that document data lineage require end users to enter from and to fields, transforms, and write up transform logic. Sometimes, the manual documentation is never updated when code changes, resulting in data lineage records not matching what is running in production.

Existing solutions log every transformation, resulting in an overwhelming number of logs to be reviewed. End users are not able to review every log with sophistication. When data involved in a transformation process such as input data or output data of the transformation process is incorrect, the existing solutions are not able to determine what causes the problem.

Sometimes, each existing data lineage solution is very specific and limited to one technical implementation of a proprietary software.

In view of the foregoing, a need exists for a data lineage solution that works with multiple environments, provides more fine-grained control to ensure accuracy of data transformation, and performs rule-based, trigger-initiated logging so as to avoid logging of every data transformation.

SUMMARY

Aspects of the disclosed technology include systems and methods for tracking data lineage. This solution involves creating an API that may be called from any environment, Spark, Java, Python, and Ab Initio, among other possibilities. The API is set up so that the payload includes name of the job, environment, timestamp, from elements, from values, to elements, to values, and the code that runs between to and from steps. There is also a rule setup that defines when to log data lineage. Rules may be set up so that if certain conditions are met, such as when an input or output value is less or more than a threshold, then logging is performed. The API may record data identifiers, data pointers or links to where the data locates. Alternatively, the API may record copies of data values. The API may write directly to a Kafka or other asynchronous messaging platform, and then all the logged lineage events may be collected into a central system.

Consistent with the disclosed embodiments, systems and methods for tracking data lineage are disclosed.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 4 illustrates sample input data and output data of a transformation system according to one aspect of the disclosed technology.

FIG. 5 illustrates exemplary rules set up in an API for triggering data lineage logging according to one aspect of the disclosed technology.

FIG. 6 illustrates sample lineage record generated by the data lineage tracking system according to one aspect of the disclosed technology.

DETAILED DESCRIPTION

Figure 1:
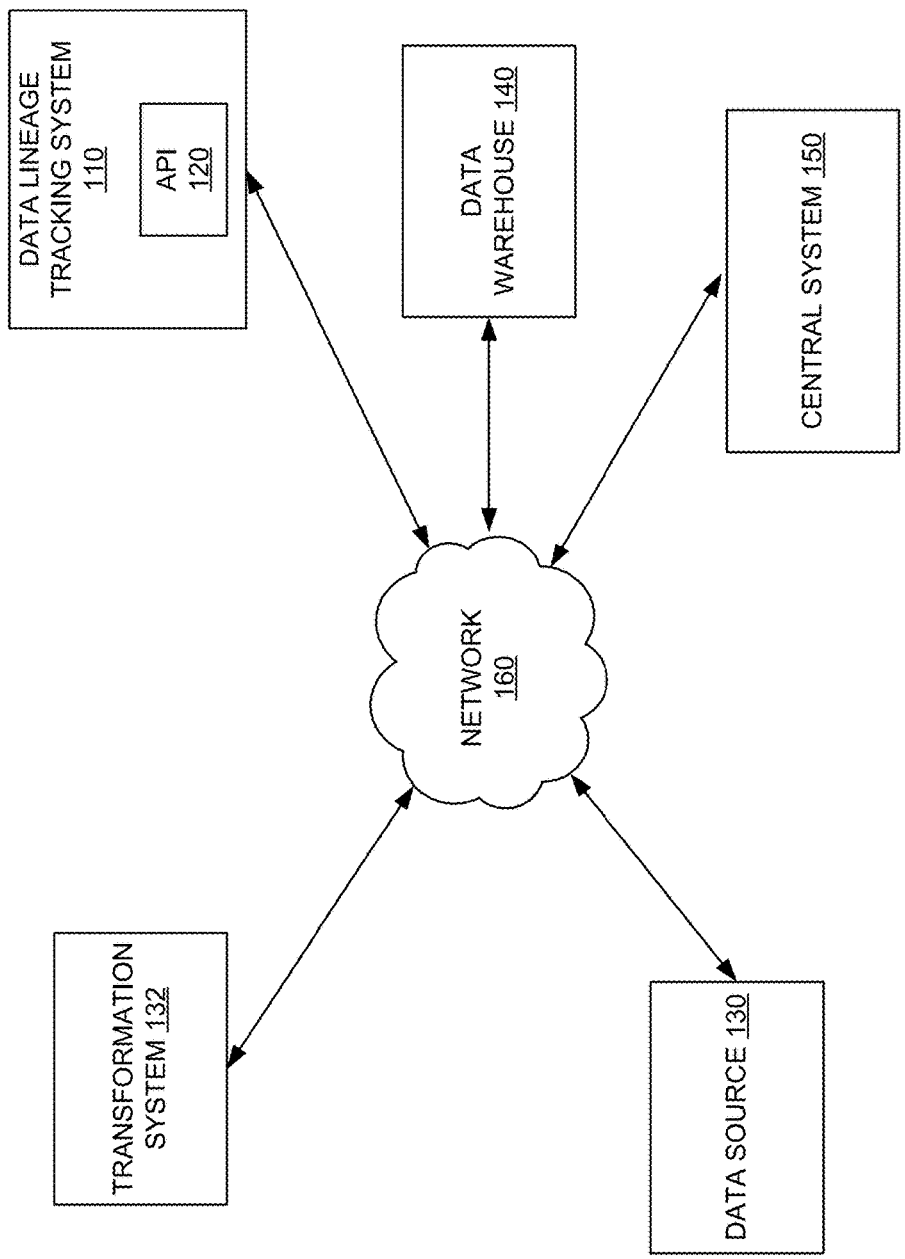
FIG. 1 is a diagram of an example environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Consistent with the disclosed embodiments, a system for tracing data lineage comprises a non-transitory computer readable medium and a processor. The processor is configured to execute an API to perform the following. The processor instantiates a first instance of the API to document a first data lineage in a first data transformation process. The processor instantiates a second instance of the API to document a second data lineage in a second data transformation process. The processor sends the first data lineage and the second data lineage for storage in the non-transitory computer readable medium. The first data lineage tracks information related to data transformation that occurs during the first data transformation process. The second data lineage tracks information related to data transformation that occurs during the second data transformation process.

In one embodiment, the processor receives a first parameter or rule indicating a first threshold requirement to document the first data lineage.

In one embodiment, the processor receives a second parameter or rule indicating a second threshold requirement to document the second data lineage.

In one embodiment, the information related to data transformation includes a data error.

In one embodiment, the data transformation relates to accounting balances. The first threshold requirement is a predetermined balance amount. The first data lineage tracks accounting balances when the accounting balances exceed the predetermined balance amount.

In one embodiment, the processor instantiates the first instance of the API at a first frequency.

In one embodiment, the processor instantiates the second instance of the API at a second frequency.

In one embodiment, the processor instantiates at least one of the first instance of the API and the second instance of the API at a predetermined time.

In one embodiment, the first instance of the API documents the first data lineage in the first data transformation process in real time.

In one embodiment, the processor determines whether the first data transformation process runs correctly based on the first data lineage, and the processor determines whether the second data transformation process runs correctly based on the second data lineage.

Another aspect of the disclosed technology relates to a method for tracing data lineage. The method includes executing, by a processor, an application programming interface (API) to perform the following. The processor instantiates a first instance of the API to document a first data lineage in a first data transformation process. The processor instantiates a second instance of the API to document a second data lineage in a second data transformation process. The processor sends the first data lineage and the second data lineage for storage in a non-transitory computer readable medium. The first data lineage tracks information related to data transformation that occurs during the first data transformation process. The second data lineage tracks information related to data transformation that occurs during the second data transformation process.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations, the environment 100 may include one or more of the following: one or more data lineage tracking systems 110 with an API 120, one or more data sources 130, one or more transformation systems 132, one or more data warehouses 140, a central system 150 and one or more networks 160.

Figure 2:
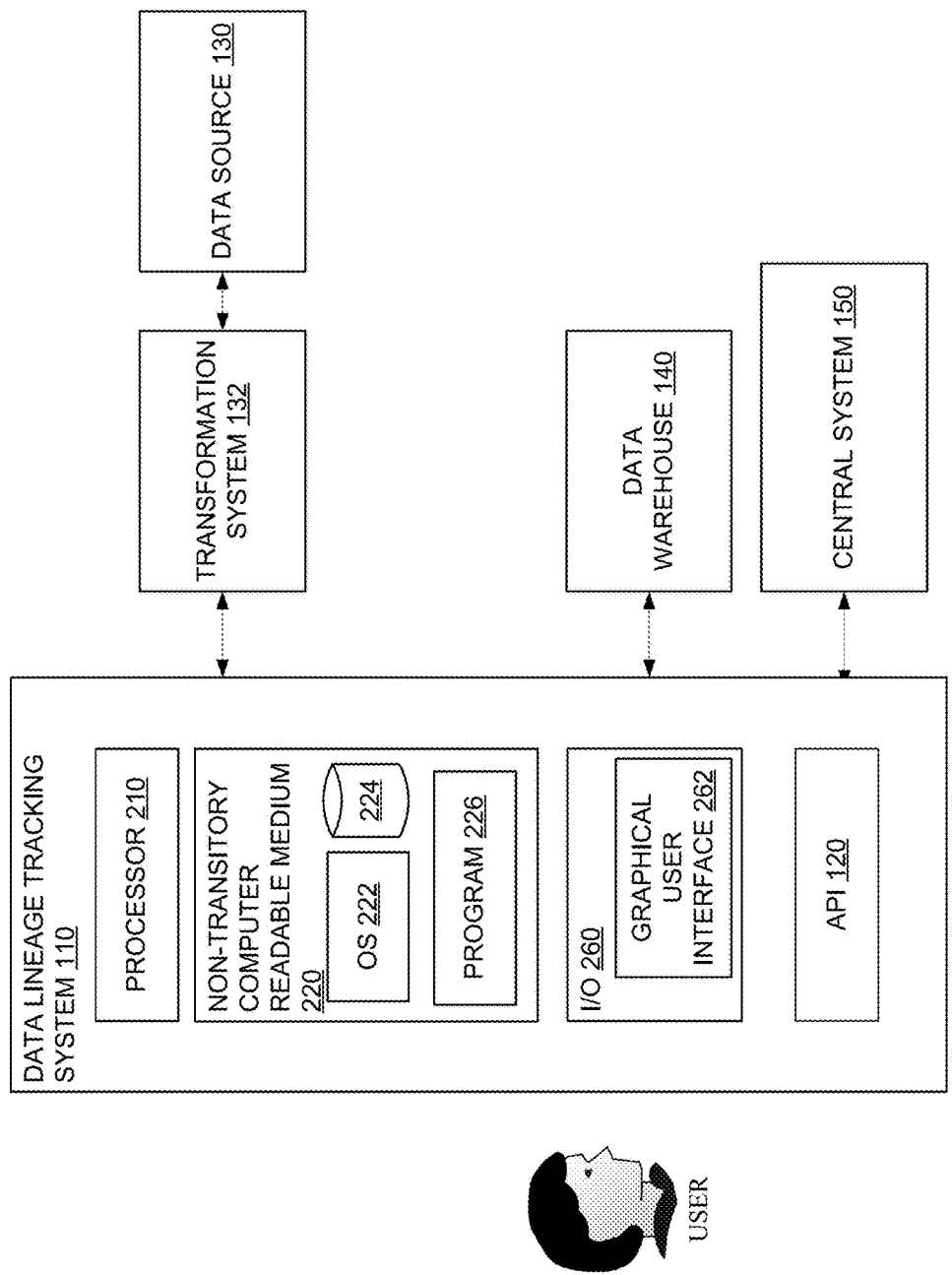
FIG. 2 is an example block diagram illustrating a data lineage tracking system according to one aspect of the disclosed technology.

FIG. 2 provides a block diagram of an example data lineage tracking system 110 that may implement certain aspects of the present disclosure. The data lineage tracking system 110 may trace data lineage. The system 110 may include a processor 210 configured to execute the API 120. The system 110 may include a non-transitory computer readable medium 220.

Referring to FIG. 2, the transformation system 132 may receive input data from one or more data sources 130 and transform the received input data to output data. The transformation system 132 may perform one or more of the following: data analysis, batch processing, quantitative and qualitative data processing, and data manipulation, among other possibilities. The transformation system 132 may include high-volume data processing applications and enterprise application integration. The transformation system 132 may provide a platform for parallel data processing applications. Examples of the transformation system 132 may include Ab Initio software or custom java code, among other possibilities. The transformation system 132 may provide its input data and/or output data to the data lineage tracking system 110. The input data and output data of the transformation system 132 may be processed by multiple instances of the API 120. The API 120 may be called or invoked by the transformation system 132 before the transformation system 130 transforms the input data. The API 120 may analyze the input data to the transformation system 130 and determine whether transformation should take place. The transformation system 132 may receive instructions from the API 120, indicating how to proceed with transformation or whether to proceed with transformation. The API 120 may log the input data and the output data of the transformation system based on how rules or parameters are set up in the API 120.

In one example, when performing logging, the API 120 may log data identifiers, data pointers, or links to where the input data and the output data reside. The API 120 may log one or more identifiers that indicate where the data came from, one or more identifiers that indicate one or more transformation processes that are performed on the data, and one or more identifiers that indicate where the data went.

In another example, when performing logging, the API 120 may log copies of the input data value and the output data value.

By way of example, FIG. 4 illustrates some sample input and output data of the transformation system 132. The input data may be provided by the data source 130 to the transformation system 132. The input data may include source records. The transformation system 132 may transform the input data to output data. The output data may include target records. In the example as illustrated in FIG. 4, the transformation system 132 may move columns "AcctId", "Status", "Balance", and "CreditLimit" from the input data to corresponding columns in the output data. Further, the transformation system 132 may perform calculation based on two columns "Balance" and "CreditLimit" of the input data, such as dividing "Balance" by "CreditLimit", and generating a division result as shown in the last column "Balance % of Limit" of the output data. The transformation system 132 may provide the input data and/or the output data to the API 120.

The API 120 may analyze the input data to the transformation system 130 and determine whether transformation should take place. For example, with respect to the record Acct Id 3423554 in the input data that has a CreditLimit of 0, as highlighted in FIG. 4, the API 120 may determine that no division should take place. For instance, the API 120 may determine that the transformation system 132 should not divide balance by credit limit to compute "Balance % of Limit" when the CreditLimit is 0. The API 120 may send an instruction to the transformation system 130 instructing the transformation system 130 to not perform calculation in this instance. The API 120 may nevertheless allow the transformation 130 to move data in this instance, for example, moving columns "AcctId," "Status," "Balance," and "CreditLimit" in the input data to corresponding columns in the output data. In this instance when no division is performed, the output data from the transformation system 130 may be identical to its input data. The API 120 may include a rule to log records, including the input data as well as the output data of the transformation system 130, even though no division takes place.

In another instance, for the record Acct Id 3423549 that has a Balance of 100000 and Credit Limit of 3400, the API 120 may allow the transformation system 130 to proceed with the division to compute "Balance % of Limit." The "Balance % of Limit" computed by the transformation system 132 for this specific record may meet one or more rules set up in the API 120 that trigger data lineage logging. The API 120 may then perform data lineage logging of this specific record.

Each instance of the API 120 may write data to a database, or stream data to one or more data warehouses 140 or one or more central systems 150.

The API 120 may be designed to be callable from any environment, such as Spark, Java, Python, and Ab Initio, among other possibilities. The API 120 may be set up so that the payload includes name of the job, environment, timestamp, from element(s), from value(s), to elements, to values, and code that runs between to and from steps.

The API 120 may pull data from the transformation system 132 and perform calculation. The API 120 may document data lineage of data transformation performed by the transformation system 132, by logging input data and output data of the transformation system 132 that meet certain rules set up in the API.

In one embodiment, when logging data lineage, the API may log data identifiers, data pointers, or links to where the data resides, instead of data values. For example, the API may log one or more of the following as data lineage: a transformation identifier of a transformation process, one or more identifiers indicating where the input data provided to the transformation process locates, one or more identifiers indicating where the output data generated by the transformation process locates, and the specific rule in the API that triggers the logging.

In another embodiment, when logging data lineage, the API may log one or more of the following as data lineage: a transformation identifier of a transformation process, input data value provided to the transformation process, input data name, output data value generated by the transformation process, output data name, and the specific rule in the API that triggers the logging.

FIG. 6 shows example data lineages logged by the API. The API 120 may log data lineages of different transformation processes. Each transformation process may be assigned with a unique transformation identifier.

The API 120 may perform data mapping in real-time, including but not limited to, everyday balance, and transaction data, among other possibilities. The API 120 may trace data lineage transformation in real-time. In one example, the API 120 may be executed in the middle of a conversation between a client system and a backend system. The API 120 may log transformation. For instance, the API 120 may determine whether data transformation deviates from an acceptable boundary or whether information related to data transformation includes a data error, and perform logging when the data transformation deviates from the acceptable boundary or an error occurs.

Based on data provided by the transformation system 132, including its input data and/or output data, the API 120 may compute a number of derived metrics, including, but not limited to, average, mean, media values, standard deviations, and aggregation values. The input/output data provided by the transformation system 132 may include a record set that has a plurality of records. A rule may be set up in the API 120 to log any record that is at least one standard deviation away from an average, mean or median value of the entire record set. For example, as shown in FIG. 4, the record Acct Id 3423549 that has with a Balance % of Limit of 29.41176471 is several deviations away from Balance % of Limit of remaining records. As such, as illustrated in FIG. 6, the API 120 logs this specific record. The API may document lineage about how the computation runs, when the computation runs in real-time. The API 120 may facilitate debugging.

The data lineage tracking system 110 may know when to launch the API 120. Parameters may be set up in the data lineage tracking system 110 to define how often the API 120 could be called.

In one example, the processor 210 may be configured to instantiate a first instance of the API 120 to document a first data lineage in a first data transformation process. The first data lineage may track information related to data transformation that occurs during the first data transformation process. The processor may receive a first parameter or rule indicating a first threshold requirement to document the first data lineage. The processor may instantiate the first instance of the API at a first frequency. For example, right after a code release, the API 120 may be set up to run for the first 1000 records, and then run once after every million records. In another example, the API 120 may be set up to log every $10^{th}$, $100^{th}$ or $1000^{th}$ record. The first instance of the API 120 may document the first data lineage in the first data transformation process in real time. The processor 210 may determine whether the first data transformation process runs correctly based on the first data lineage.

The processor 210 may instantiate a second instance of the API 120 to document a second data lineage in a second data transformation process. The second data lineage may track information related to data transformation that occurs during the second data transformation process. The processor may receive a second parameter or rule indicating a second threshold requirement to document the second data lineage. The processor may instantiate the second instance of the API at a second frequency. The processor 210 may determine whether the second data transformation process runs correctly based on the second data lineage.

The processor 210 may send the first data lineage and the second data lineage for storage in the non-transitory computer readable medium 220. The first data lineage may track information related to data transformation that occurs during the first data transformation process. The second data lineage may track information related to data transformation that occurs during the second data transformation process.

The processor 210 may instantiate at least one of the first instance of the API and the second instance of the API at a predetermined time. In one example, the API 120 may be set up to log during certain time intervals, such as between 1 pm and 2 pm.

In some embodiments, the API may log or document data lineage when certain conditions are met. The API may log a record when an input or output value of the record is less or more than a threshold. In one instance, the API may be set up such that the API 120 may log the record when an input or output of the record is greater than a predetermined threshold, such as when an input has a value greater than 7.

In another example, the API 120 may be turned off altogether during execution of the code. In one example, the API 120 may be turned off when enough data has been collected. A rule may be set up in the API 120 which turns off logging after the number of records that has been logged exceeds a predetermined threshold. This rule may be triggered when the number of records that has been logged exceeds the predetermined threshold.

Each instance of the API 120 may send information to a communication channel. For instance, the API 120 may write directly to a database, data warehouse 140, central system 150, Kafka or other asynchronous messaging platform. In one example, all the lineage events generated by the API 120 may be collected into the central system 150 or the data warehouse 140, and set up to be easily reported on and queried.

An end user such as a tester or a production support technician may review the log produced by the API 120.

Figure 3:
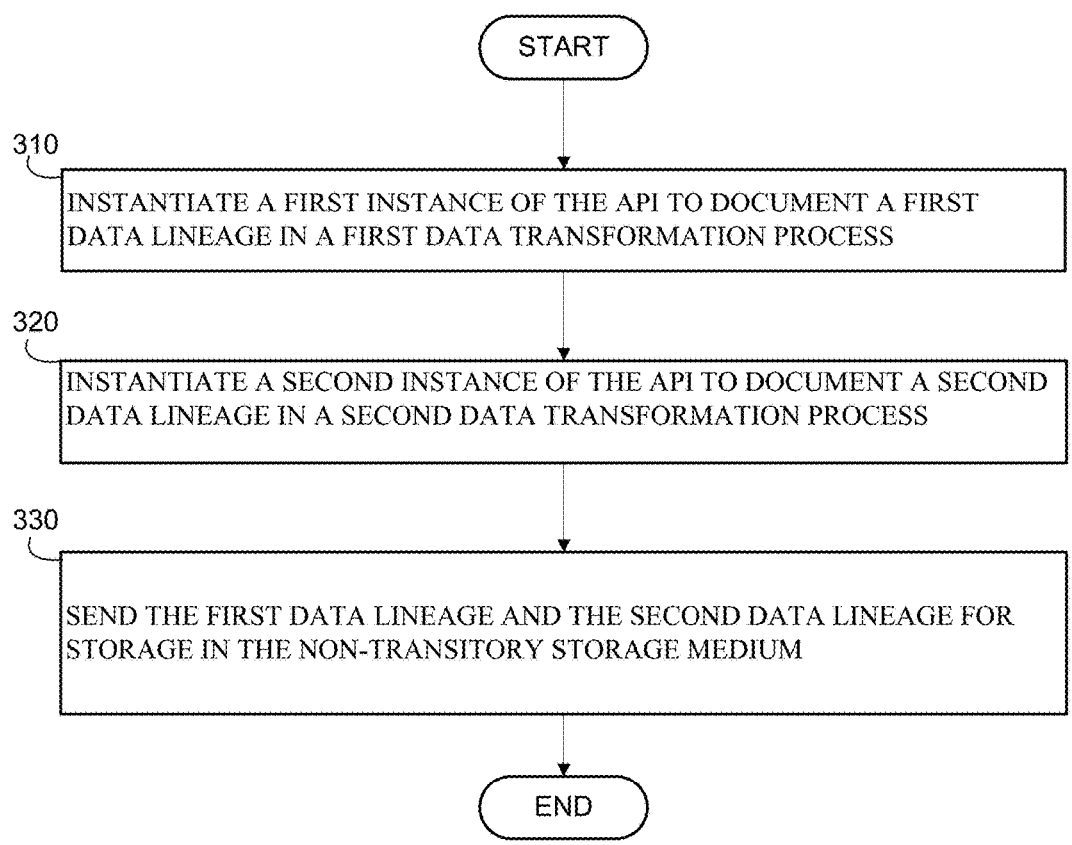
FIG. 3 is an example flow chart of a process performed by the data lineage tracking system according to one aspect of the disclosed technology.

FIG. 3 illustrates an example flow chart of a data lineage tracing process performed by the data lineage tracking system 110. The processor 210 may execute the API 120 to perform the following. At 310, the processor 210 may instantiates a first instance of the API to document a first data lineage in a first data transformation process. At 320, the processor 210 may instantiate a second instance of the API to document a second data lineage in a second data transformation process. At 330, the processor 210 may send the first data lineage and the second data lineage for storage in a non-transitory computer readable medium.

Referring back to FIG. 2, the data lineage tracking system 110 may include the processor 210, an input/output ("I/O") device 260, the non-transitory computer readable medium 220 containing an operating system ("OS") 222 and a program 226. For example, the data lineage tracking system 110 may be a single device or server or may be configured as a distributed computer system including multiple servers, devices, or computers that interoperate to perform one or more of the processes and functionalities associated with the disclosed embodiments. In some embodiments, the data lineage tracking system 110 may further include a peripheral interface, a transceiver, a mobile network interface in communication with the processor 210, a bus configured to facilitate communication between the various components of the data lineage tracking system 110, and a power source configured to power one or more components of the data lineage tracking system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Once the data lineage tracking system 110 receives metrics, events and logs, the data lineage tracking system 110 may store such information within the non-transitory computer readable medium 220. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 630 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include a database 224 to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the data lineage tracking system 110. For example, the data lineage tracking system 110 may access one or more remote programs 226, that, when executed, perform functions related to disclosed embodiments.

The data lineage tracking system 110 may also include one or more I/O devices 260 that may comprise one or more interfaces for receiving signals or input from devices and providing signals or output to one or more devices that allow data to be received and/or transmitted by the data lineage tracking system 110. For example, the data lineage tracking system 110 may include interface components, which may provide interfaces to one or more input devices, such as one or more keyboards, mouse devices, touch screens, track pads, trackballs, scroll wheels, digital cameras, microphones, sensors, and the like, that enable the data lineage tracking system 110 to receive data from one or more users. The data lineage tracking system 110 may include a display, a screen, a touchpad, or the like for displaying images, videos, data, or other information. The I/O devices 260 may include the graphical user interface 262.

In exemplary embodiments of the disclosed technology, the data lineage tracking system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 160 may include a network of interconnected computing devices more commonly referred to as the internet. The network 160 may be of any suitable type, including individual connections via the internet such as cellular or WiFi networks. In some embodiments, the network 160 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 160 may comprise any type of computer networking arrangement used to exchange data. For example, the network 106 may be the Internet, a private data network, virtual private network using a public network, and/or other suitable connection(s) that enables components in system environment 100 to send and receive information between the components of system 100. The network 160 may also include a public switched telephone network ("PSTN") and/or a wireless network. The network 160 may also include local network that comprises any type of computer networking arrangement used to exchange data in a localized area, such as WiFi, Bluetooth™ Ethernet, and other suitable network connections that enable components of system environment 100 to interact with one another.

The central system 150 and the data warehouse 140 may receive data generated by the data lineage tracking system 110 and the API 120. The central system 150 and the data warehouse 140 may be built on streaming technology. When the API 120 places or write data on a streaming topic, the central system 150 and/or the data warehouse 140 may listen to that topic and read in data on that topic. The central system 150 and the data warehouse 140 may be operated by developers and/or operators. The data warehouse 140 may store data used for analytics. The data warehouse 130 may not be used for real-time access. The central system 150 may allow real-time access to data stored therein.

Exemplary Use Cases

The following example use case describes examples of particular data lineage tracking implementations. This is intended solely for explanatory purposes and not limitation.

In one example, the API 120 may perform data lineage logging that relates to accounting balances. The processor 210 may instantiate a first instance of the API 120 to document a first data lineage in a first data transformation process. The first data lineage may track accounting balances when the accounting balances exceed a first threshold requirement. The first threshold requirement may be a predetermined balance amount.

In another example, the API 120 may not run all the time. For instance, the API 120 may run at a predetermined frequency. For instance, the API 120 may run once for every 100, or 1000 records.

FIG. 5 illustrates exemplary rules set up by developers and/or operators. These rules may be stored in a rule repository accessible by the API 120. The rule repository may be the non-transitory computer readable medium 220. In the example illustrated in FIG. 5, three rules are set up to define when lineage data should be logged. Each rule defines one or more triggering conditions for logging lineage data. Developers and/or operators may set up one or more rules. For example, a rule that requires logging for every $1000^{th}$ record may be stored in the rule repository.

FIG. 6 illustrates sample lineage record output or written out by the API 120. The highlighted entries in FIG. 4 demonstrate input/output data that meet the triggering conditions of the rules in FIG. 5, and highlighted entries in FIG. 6 demonstrate corresponding lineage data log generated or written out by the API 120.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for tracing data lineage, comprising:
 a non-transitory computer readable medium storing a plurality of predetermined rules for documenting data lineage; and
 a processor in communication with a transformation system that performs a plurality of data transformation processes, the processor configured to receive at least one of input data and output data of each data transformation process from the transformation system, the processor configured to execute an application programming interface (API) to perform the following:
  instantiate a first instance of the API to perform the following:
   receive first input data of a first data transformation process submitted to the transformation system, the first data transformation process identifiable by a first transformation process identifier;
   compare the first input data to a first predetermined threshold;
   send a first instruction to the transformation system to at least partially abort the first data transformation process based on the comparison between the first input data and the first predetermined threshold;
   determine whether a first data lineage associated with the first data transformation process meets a first predetermined rule; and
   document the first data lineage associated with the first data transformation process according to the first predetermined rule, the first data lineage including the first transformation process identifier;
  instantiate a second instance of the API to perform the following:
   receive second input data of a second data transformation process submitted to the transformation system, the second data transformation process identifiable by a second transformation process identifier;
   compare the second input data to a second predetermined threshold;
   send a second instruction to the transformation system to proceed with the second data transformation process based on the comparison between the second input data and the second predetermined threshold;
   determine whether a second data lineage associated with the second data transformation process meets a second predetermined rule, wherein the second predetermined rule requires documenting the second data lineage when the second data lineage meets a rule threshold relative to a derived metric computed based on a plurality of data lineages of a plurality of data processes, and wherein the derived metric includes at least one of average, mean and median computed from the plurality of data lineages; and
   document the second data lineage associated with the second data transformation process according to the second predetermined rule, the second data lineage including the second transformation process identifier; and
  send the first data lineage and the second data lineage for storage in the non-transitory computer readable medium, wherein the first data lineage tracks information related to data associated with the first data transformation process, and the second data lineage tracks information related to data associated with the second data transformation process.

2. The system of claim 1, wherein the documented first data lineage includes the first transformation process identifier of the first data transformation process, one or more identifiers indicating location of the first input data provided to the first data transformation process, one or more identifiers indicating location of output data generated by the first data transformation process, and a rule identifier specifying the first predetermined rule in the API that triggers the documentation of the first data lineage.

3. The system of claim 1, wherein the documented first data lineage includes the first transformation process identifier of the first data transformation process, an input data value of the first input data provided to the first data transformation process, an output data value generated by the first data transformation process, and a rule identifier specifying the first predetermined rule in the API that triggers the documentation of the first data lineage.

4. The system of claim 1, wherein the first data transformation process or the second data transformation process relates to accounting balances, the first predetermined rule includes a predetermined balance amount, and the first data lineage tracks accounting balances when the accounting balances exceed the predetermined balance amount.

5. The system of claim 1, wherein the processor instantiates the first instance of the API at a first frequency, and the processor instantiates the second instance of the API at a second frequency.

6. The system of claim 1, wherein the processor instantiates at least one of the first instance of the API and the second instance of the API at a predetermined time.

7. The system of claim 1, wherein the second predetermined rule requires documenting the second data lineage when data of the second data lineage is at least one standard deviation away from the derived metric computed based on the plurality of data lineages.

8. The system of claim 1, wherein the processor determines whether the first data transformation process runs correctly based on the first data lineage, and the processor determines whether the second data transformation process runs correctly based on the second data lineage.

9. A method for tracing data lineage, comprising:
receiving, by a processor, at least one of input data and output data of each data transformation process from a transformation system;
executing, by the processor, an application programming interface (API) to perform the following:
instantiating a first instance of the API to perform the following:
receive first input data of a first data transformation process submitted to the transformation system, the first data transformation process identifiable by a first transformation process identifier;
compare the first input data to a first predetermined threshold;
send a first instruction to the transformation system to at least partially abort the first data transformation process based on the comparison between the first input data and the first predetermined threshold;
determine whether a first data lineage associated with the first data transformation process meets a first predetermined rule; and
document the first data lineage associated with the first data transformation process according to the first predetermined rule, the first data lineage including the first transformation process identifier;
instantiating a second instance of the API to perform the following:
receive second input data of a second data transformation process submitted to the transformation system, the second data transformation process identifiable by a second transformation process identifier;
compare the second input data to a second predetermined threshold;
send a second instruction to the transformation system to proceed with the second data transformation process based on the comparison between the second input data and the second predetermined threshold;
determine whether a second data lineage associated with the second data transformation process meets a second predetermined rule, wherein the second predetermined rule requires documenting the second data lineage when the second data lineage meets a rule threshold relative to a derived metric computed based on a plurality of data lineages of a plurality of data processes, and wherein the derived metric includes at least one of average, mean and median computed from the plurality of data lineages; and
document the second data lineage associated with the second data transformation process according to the second predetermined rule, the second data lineage including the second transformation process identifier; and
sending the first data lineage and the second data lineage for storage in a non-transitory computer readable medium, wherein the first data lineage tracks information related to data associated with the first data transformation process, and the second data lineage tracks information related to data associated with the second data transformation process.

10. The method of claim 9, wherein the documented first data lineage includes the first transformation process identifier of the first data transformation process, one or more identifiers indicating location of the first input data provided to the first data transformation process, one or more identifiers indicating location of output data generated by the first data transformation process, and a rule identifier specifying the first predetermined rule in the API that triggers the documentation of the first data lineage.

11. The method of claim 9, wherein the documented first data lineage includes the first transformation process identifier of the first data transformation process, an input data value of the first input data provided to the first data transformation process, an output data value generated by the first data transformation process, and a rule identifier specifying the first predetermined rule in the API that triggers the documentation of the first data lineage.

12. The method of claim 9, wherein the first data transformation process or the second data transformation process relates to accounting balances, the first predetermined rule includes a predetermined balance amount, the first data lineage tracks accounting balances when the accounting balances exceed the predetermined balance amount.

13. The method of claim 9, wherein the processor instantiates the first instance of the API at a first frequency, and the processor instantiates the second instance of the API at a second frequency.

14. The method of claim 9, wherein the processor instantiates at least one of the first instance of the API and the second instance of the API at a predetermined time.

15. The method of claim 9, wherein the second predetermined requires documenting the second data lineage when data of the second data lineage is at least one standard deviation away from the derived metric computed based on the plurality of data lineages.

16. The method of claim 9, wherein the processor determines whether the first data transformation process runs correctly based on the first data lineage, and the processor determines whether the second data transformation process runs correctly based on the second data lineage.

* * * * *